April 8, 1952 C. K. JUDD, JR 2,591,828
GLASS CUTTING DEVICE
Filed Oct. 7, 1949
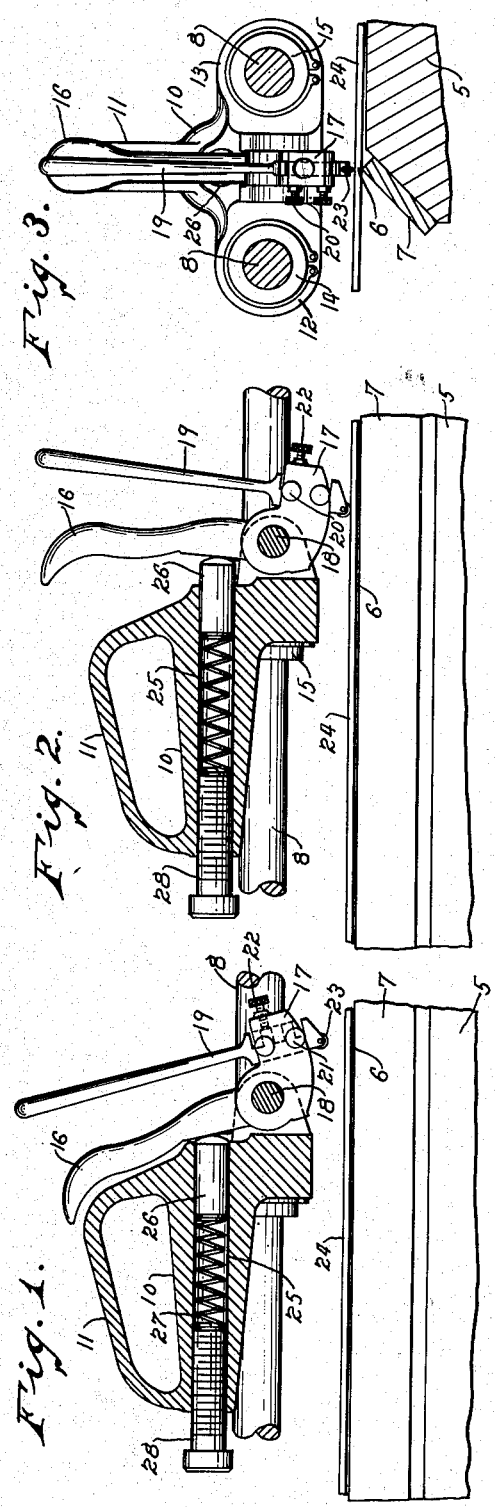
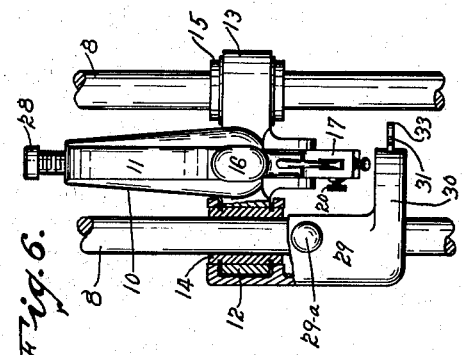
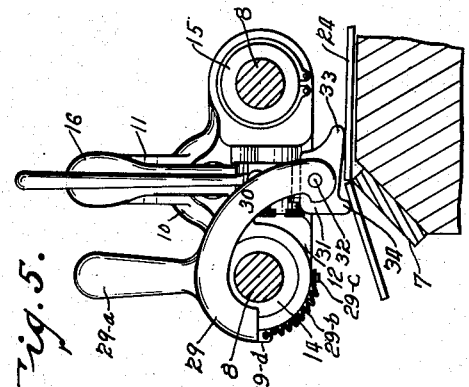
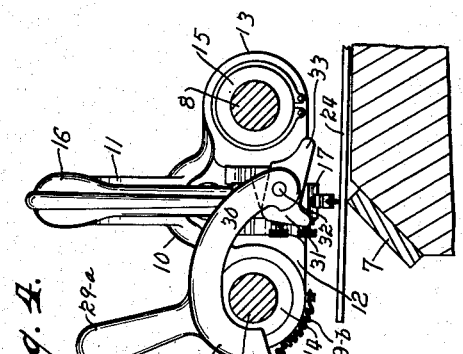
INVENTOR.
CHESTER K. JUDD JR.
BY
Louis V. Lucia
ATTORNEY Patented Apr. 8, 1952

2,591,828

UNITED STATES PATENT OFFICE 2,591,828

GLASS CUTTING DEVICE

Chester K. Judd, Jr., Bristol, Conn., assignor to The Fletcher-Terry Company, Forestville, Conn., a corporation of Connecticut Application October 7, 1949, Serial No. 120,088

7 Claims. (Cl. 49—48)

This invention relates to a glass cutting device and more particularly to a cutter head for glass cutting boards such as shown and described in my recent Patent No. 2,513,876 entitled Glass Cutters, issued July 4, 1950.

Glass cutting heads such as heretofore used have required glass cutting tools especially designed to fit the said heads and it has, therefore, been necessary to keep a supply of such cutting tools on hand. In the event of the supply becoming exhausted, the glass cutting head could not be used until new cutters were obtained and considerable time was lost and inconvenience caused for the reason that no standard glass cutting tool could be fitted in the cutting head.

It is an object of this invention, therefore, to provide a glass cutting head for glass cutting machines or boards having a holder which will receive or hold glass cutting tools of a standard type.

A further object of this invention is to provide such a glass cutting head in which the tension that is applied by the cutting tool upon the glass being cut thereby may be readily adjusted.

A further object of the invention is the provision of a glass cutting head having associated therewith a glass breaking mechanism for conveniently and accurately breaking off a piece of glass on a line of cut which has been made on said glass.

A still further object of the invention is to provide a glass cutting head having new and useful features highly advantageous over such cutting heads as heretofore known.

Further objects and advantages of this invention will be more clearly understood from the following description and the accompanying drawing in which:

Fig. 1 is a side view showing my improved cutting head partly in central vertical section and with the glass cutting tool thereon in raised position.

Fig. 2 is a similar view showing the said cutting tool in cutting position.

Fig. 3 is an end view of said cutting head in the position shown in Fig. 2 and with the breaking device omitted to show the construction.

Fig. 4 is a similar view showing, in normal position, the breaking device used in connection with said head.

Fig. 5 is a similar view showing the cutting tool in raised position and the breaking device in operating position.

Fig. 6 is a plan view of said cutting device, on a reduced scale, with parts broken away to show its construction.

As illustrated in the accompanying drawings, the numeral 5 indicates a frame of a conventional form of glass cutting board having a breaker edge 6 running along an edge of said board provided by a suitable breaker bar 7.

A suitable track is preferably provided by a pair of spaced supporting bars 8—8 which are mounted on said board and spaced above the said breaker edge to slidably support the glass cutting head.

My improved cutter head preferably consists of a body portion 10 having a handle portion 11 and laterally projecting extensions 12 and 13 within which are secured suitable bushings 14 and 15 that slidably support the body on the track bars 8—8.

A cutter carrier, preferably comprising a handle portion 16 and a cutter mounting portion 17, is pivotally mounted at 18 to the forward portion of the body and the said cutter mounting portion is provided with an opening extending vertically therethrough and adapted to receive a conventional form of glass cutter, such as indicated at 19, which extends vertically through said opening and is secured to the supporting portion 17 by means of clamping screws 20 and 21, engaging the side of the cutter, and a clamping screw 22 engaging the end of the cutter. The said glass cutter includes a cutting wheel 23 which is positioned to engage a sheet of glass, indicated at 24, resting on said board so that it will score the said sheet on a line of cut in line with said breaker edge 6.

The body of the cutter head has an opening 25 extending lengthwise therethrough to contain a plunger 26 that is urged against the handle portion 16 by means of a spring 27 which is adjustable to vary the pressure with which the cutting wheel 23 is applied against the glass sheet 24 for the cutting operation; the said spring being adjustable by means of the adjusting screw 28 which is threaded to the body 10 and extends rearwardly therefrom to render said adjusting screw readily accessible for adjustment.

A breaker mechanism is provided on said cutting head for breaking off the piece of glass which is cut from the glass sheet by the cutting operation. This breaker mechanism may include a rocker member 29 which is carried on the supporting track by the cutting head and is rotatably connected to said head, preferably by being mounted upon the end portions of the bushing 14, as clearly illustrated in Fig. 6, so that the said rocker member will move along the supporting track with the cutting head and may be rendered readily operable for a breaking operation as will be hereinafter described.

The said rocker member has an operating handle 29-a and a breaker carrying arm 30 which extends downwardly between the track bars 8—8.

The rocker member 29 is retained in retracted position, as illustrated in Fig. 4, by means of a spring 29-b which has one end fastened to a stud 29-c projecting from the extension 12 and the other end fastened to a tab 29-d on the said rocker member.

A breaker member, preferably in the form of a plate 31, is pivotally secured, as at 32, to the arm 30 at a point above the breaker edge 6 and the said plate 31 has a finger portion 33 which overlies the glass sheet inside of the line of cut, and a breaker projection 34 which extends over the breaker edge and engages the piece of said glass to be cut off. The said breaker plate 31 is preferably mounted within a notch in the arm 30 and is pivotally positioned therein by engagement between the bottom of the slot and the upper end of the plate, as clearly illustrated in Fig. 4, to retain the said breaker plate in position on said arm.

In the operation of my improved cutting head above described, the tension on the spring 27 is first adjusted to provide the desired pressure between the cutting wheel 23 and the glass sheet 24. The glass sheet is then placed upon the cutting board and positioned so that the piece which is to be cut off will overhang the breaker edge 6. The handle 16 is then released and the cutting head is moved on the track bars 8—8 so that the cutter wheel 23 is carried across the sheet 24 and the said sheet is scored on a line of cut running in line with and directly above the breaker edge 6 and extending fully across the said sheet. The movement of the said cutting head will then be limited, by suitable means, not shown, at the end of the track to position the head on the track so that the cutting wheel will be off the glass sheet and the breaker plate 31 will overlie a marginal portion of the glass sheet over the breaker edge 6. The handle 29-a is then operated to rock the arm 30 and cause the breaker plate to engage the marginal portion of the glass on the opposite sides of the line of cut. Pressure upon the handle 29-a will then cause the projection 33 to retain the glass sheet upon the cutting board while the projection 34 will force the portion of said sheet to be cut off downwardly, against the breaker edge 6, and cause said portion to break off along the score line which is made thereon on the line of cut.

The breaker member 31, being relatively thin and engaging only the marginal portion of the glass, will cause the breaking of said glass to occur first at the edge of the glass and then move along the line of cut; thereby causing an accurate break along said line of cut by performing the severing operation in accordance with the correct procedure for breaking a glass sheet on a line of cut.

I claim:

1. A glass cutting board having a pair of parallel bars forming a supporting track, a cutter head including an elongated body portion disposed between and substantially parallel to said bars and having lateral extensions slidably mounted on said bars, a handle portion on said body for sliding it along said bars, a lever pivotally carried on said body between said bars and including a handle portion extending upwardly therefrom in front of the body and adjacent the handle thereon and a cutter receiving portion extending forwardly of said body, means in said cutter receiving portion for clamping a cutting device therein whereby a cutter wheel of said device projects downwardly from said cutter receiving portion, and a spring pressed plunger slidably contained in an opening extending longitudinally in said body and projecting therefrom into engagement with the handle portion of the lever for normally urging the lever about its pivot to move the said cutting wheel into engagement with a sheet of glass on the board; said cutting wheel being moved away from the glass by movement of the handle portion on the lever towards the handle portion on the body.

2. A glass cutting board having a supporting track thereon, a cutter head slidable on said track and including a body portion, a cutting wheel carried by said body portion, and breaker means movable with said head and including a member having a portion adapted to engage a sheet of glass on one side of a line of cut made by said cutting wheel, for breaking off a portion of said sheet, and a separate portion adapted to engage the sheet of glass on the opposite side of said line of cut to thereby retain the main portion of the sheet against the board while the break is being made.

3. For a glass sheet cutting board comprising a supporting surface for said sheet and a supporting track along an edge of said board, a cutter head including a body adapted to be slidably mounted on said track, a cutter supporting lever pivotally mounted on said head, means urging said lever in one direction to move a cutter therein into engagement with the glass sheet, a breaker including a rocker arm rotatably connected to said head, and a breaker member carried on said arm and having projecting portions for engaging the glass sheet to retain it on said board and for breaking off a portion of said sheet on a line of cut.

4. A glass cutting board comprising a sheet supporting surface and a supporting track running parallel to and adjacent to an edge of said board, a cutter head including a body slidably mounted on said track, a lever pivotally secured to said body and having a portion extending therefrom adapted to receive a cutting device and a handle portion for manually rocking the said portion to withdraw the said cutting device from the glass sheet, spring means in said head urging said lever to force the cutting device into engagement with the sheet, a handle on said body adjacent to the handle portion of said lever, a breaker including a rocker arm pivotally mounted on said track and movable with said head, a breaker member pivotally mounted to said rocker arm and having a portion adapted to engage the sheet on said board to retain it in position thereon and a portion for breaking off a piece of said sheet on a line of cut inscribed thereon by the said cutting device, and a handle on said rocker arm adjacent to the handle on the body for operating said rocker arm.

5. A sheet glass cutting board having a pair of parallel bars adjacent to and parallel with a free edge of said board, a cutter head including a body slidably mounted on said bars and having an intermediate portion disposed between said bars, a lever pivoted to said body between said bars and including a handle portion projecting upwardly therefrom and a cutter holding portion extending forwardly of said body, and spring means in said body yieldingly urging said lever to move a cutter thereon into engagement with the surface of a sheet of glass on said board to score said sheet on a line of cut along the said free edge of the board, a breaker mechanism comprising a rocker member rotatably mounted on one of said bars and movable with said head, a rocker arm extending from said rocker member to a position between said bars, a breaker plate pivotally secured to the end of said rocker arm and having a projection adapted to press a sheet of glass downwardly upon said supporting surface and a breaking projection extending downwardly from said plate and adapted to engage and break off a piece of said glass on the score line inscribed by the cutting device, a handle on said breaker member for operating said breaker plate, and spring means normally retaining said breaker plate in raised position relatively to the glass sheet.

6. A cutting board for glass sheets comprising a supporting surface and supporting track including a pair of bars adjacent to and running parallel with a free edge of said board, a cutter head including a body portion disposed between said bars and lateral extensions slidably mounting said head to said bars, a lever pivotally carried on said body portion between said bars and including a handle extending upwardly therefrom and a cutter receiving portion extending forwardly, means in said cutter receiving portion for clamping a cutting device therein with the cutting wheel of said cutting device projecting downwardly from said portion, and spring means in said body normally urging said lever to move the cutting wheel into engagement with a sheet of glass on said board, a breaker arm rotatably mounted on and movable with said head, a handle for rocking said arm, a breaker plate pivotally mounted on said arm on an axis parallel to a line of cut inscribed by the cutting device on said sheet of glass and having a portion extending to one side of said line of cut for holding the said sheet of glass upon the cutting board and a portion extending to the opposite side of said line for engaging a portion of said sheet to be cut off and breaking off said portion on said line of cut, and spring means normally retaining said breaker plate in raised position relatively to said glass sheet.

7. A glass sheet cutting board having a supporting surface and a supporting track spaced above said surface, a cutter head including a body having laterally extending projections slidably mounted on said track, and a cutter supporting lever pivotally mounted to said head at the front end thereof and having an upwardly extending handle portion and a forwardly extending portion for receiving a cutting device; said forwardly extending portion having an opening extending vertically therethrough to receive the cutting device and clamping screws projecting into said opening for clamping the device therein, the said body having an opening extending lengthwise therethrough, a plunger in said body opening projecting through the front end thereof and engaging the handle portion of said lever, spring means in said opening forcing said plunger to normally urge said lever to force the cutting device to engage a sheet of glass on said board, an adjusting screw projecting rearwardly from the said body for varying the tension of the spring to vary the pressure between the cutting wheel and the glass sheet, a rocker arm movable with said body along said track, a breaker plate pivotally mounted in said rocker arm and disposed in front of said cutting device, and extensions on said plate for pressing the sheet of glass upon the supporting surface of the board, to retain it in position thereon, and breaking off the portion of said sheet to be cut therefrom on a line of cut made by said cutting device.

CHESTER K. JUDD, Jr.

REFERENCES CITED

The following references are of record in the file of this patent:

UNITED STATES PATENTS

| Number | Name | Date |
|---|---|---|
| 1,117,735 | Whittemore | Nov. 17, 1914 |
| 1,697,044 | Burda | Jan. 1, 1929 |
| 1,755,365 | Rowley | Apr. 22, 1930 |

FOREIGN PATENTS

| Number | Country | Date |
|---|---|---|
| 33,821 | France | 1928 |